US007664341B2

(12) United States Patent
Takemoto et al.

(10) Patent No.: US 7,664,341 B2
(45) Date of Patent: Feb. 16, 2010

(54) INDEX LAYOUT MEASUREMENT METHOD, POSITION AND ORIENTATION ESTIMATION METHOD, INDEX LAYOUT MEASUREMENT APPARATUS, AND POSITION AND ORIENTATION ESTIMATION APPARATUS

(75) Inventors: Rika Takemoto, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 11/611,404

(22) Filed: Dec. 15, 2006

(65) Prior Publication Data

US 2007/0091125 A1  Apr. 26, 2007

Related U.S. Application Data

(63) Continuation of application No. PCT/JP2006/301620, filed on Feb. 1, 2006.

(30) Foreign Application Priority Data

Feb. 2, 2005   (JP)   ............................. 2005-026879

(51) Int. Cl.
*G06K 9/36* (2006.01)
*H04N 1/46* (2006.01)
(52) U.S. Cl. ...................................... 382/287; 358/488
(58) Field of Classification Search ................ 382/293, 382/287, 289, 291; 356/620, 411, 138, 614; 702/150; 358/1.5
See application file for complete search history.

(56) References Cited

U.S. PATENT DOCUMENTS 6,792,370 B2   9/2004   Satoh et al. .................... 702/95

(Continued)

FOREIGN PATENT DOCUMENTS

JP   2000-041173   2/2000

(Continued)

OTHER PUBLICATIONS

H. Kato, et al., "An Augmented Reality System and its Calibration Based on Marker Tracking", Transactions of the Virtual Reality Society of Japan, vol. 4, No. 4, pp. 607-616 (1999)—with English translation.

(Continued)

*Primary Examiner*—Wesley Tucker
*Assistant Examiner*—Randolph Chu
(74) *Attorney, Agent, or Firm*—Fitzpatrick, Cella, Harper & Scinto

(57) ABSTRACT

An index layout measurement method and apparatus measures a relative layout relationship between a first index or index group which exists in a given first region in a physical space and a second index or index group which exists in a second region. The method includes a first image sensing step of sensing an image so as to simultaneously include some or all of the first index/index group and an auxiliary index which is temporarily laid out in the physical space and a position and orientation in a three-dimensional space of which can be defined, a second image sensing step of sensing an image so as to simultaneously include some or all of the second index/index group and the auxiliary index, and a layout calculation step of calculating a relative layout relationship among the first index/index group, the auxiliary index, and the second index/index group from one or a plurality of images obtained by performing the first image sensing step once or repeating it a plurality of number of times, and one or a plurality of images obtained by performing the second image sensing step once or repeating it a plurality of number of times. The auxiliary index is removed after the layout relationship among the respective indices laid out in the physical space is calculated.

10 Claims, 9 Drawing Sheets

U.S. PATENT DOCUMENTS

| | | | |
|---|---|---|---|
| 6,993,450 B2 | 1/2006 | Takemoto et al. | 702/153 |
| 7,092,109 B2 * | 8/2006 | Satoh et al. | 356/620 |
| 7,130,754 B2 | 10/2006 | Satoh et al. | 702/95 |
| 2003/0014423 A1 * | 1/2003 | Chuah et al. | 707/102 |
| 2005/0256396 A1 | 11/2005 | Takemoto | 600/414 |
| 2007/0092161 A1 | 4/2007 | Aratani et al. | 382/286 |

FOREIGN PATENT DOCUMENTS

| | | |
|---|---|---|
| JP | 2002-071313 | 3/2002 |
| JP | 2002-156229 | 5/2002 |
| JP | 2002-228442 | 8/2002 |
| JP | 2004-342067 | 12/2004 |

OTHER PUBLICATIONS

R. M. Haralick, et al., "Review and Analysis of Solutions of the Three Point Perspective Pose Estimation Problem", Int'l. J. Computer Vision, vol. 13, No. 3, pp. 331-336 (1994).

M. A. Fishler, et al., "Random Sample Consensus: A Paradigm for Model Fitting with Applications to Image Analysis and Automated Cartography", Comm. ACM, vol. 24, No. 6, pp. 381-395 (1981).

J. Rekimoto, "Augmented Reality Using the 2D Matrix Code", Interactive System and Software IV, Kindai kagaku sha 1996).

Kato, et al., "Augmented Reality System and its Calibration Based on Marker Tracking", Transactions of the Virtual Reality Society of Japan, vol. 4, No. 4, pp. 607-616 (1999)—English Abstract only.

H. Kato, et al., "Virtual Object Manipulation on a Table-top AR Environment", Proc. ISAR2000, pp. 111-119 (2000).

A. State, et al., "Superior Augmented Reality Registration by Integrating Landmark Tracking and Magnetic Tracking", Proc. SIGGRAPH '96, pp. 429-438 (1996).

G. Baratoff, et al., "Interactive Multi-Marker Calibration for Augmented Reality Applications", Proc. ISMAR2002, pp. 107-116 (2002).

* cited by examiner

F I G. 2A
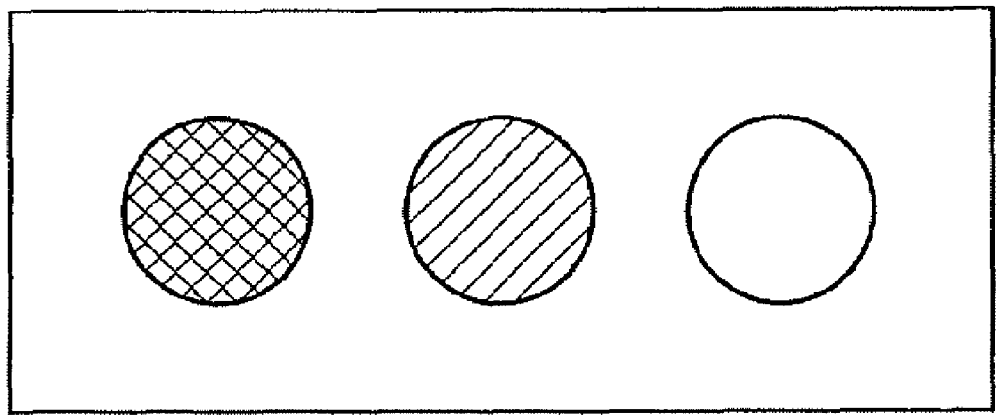

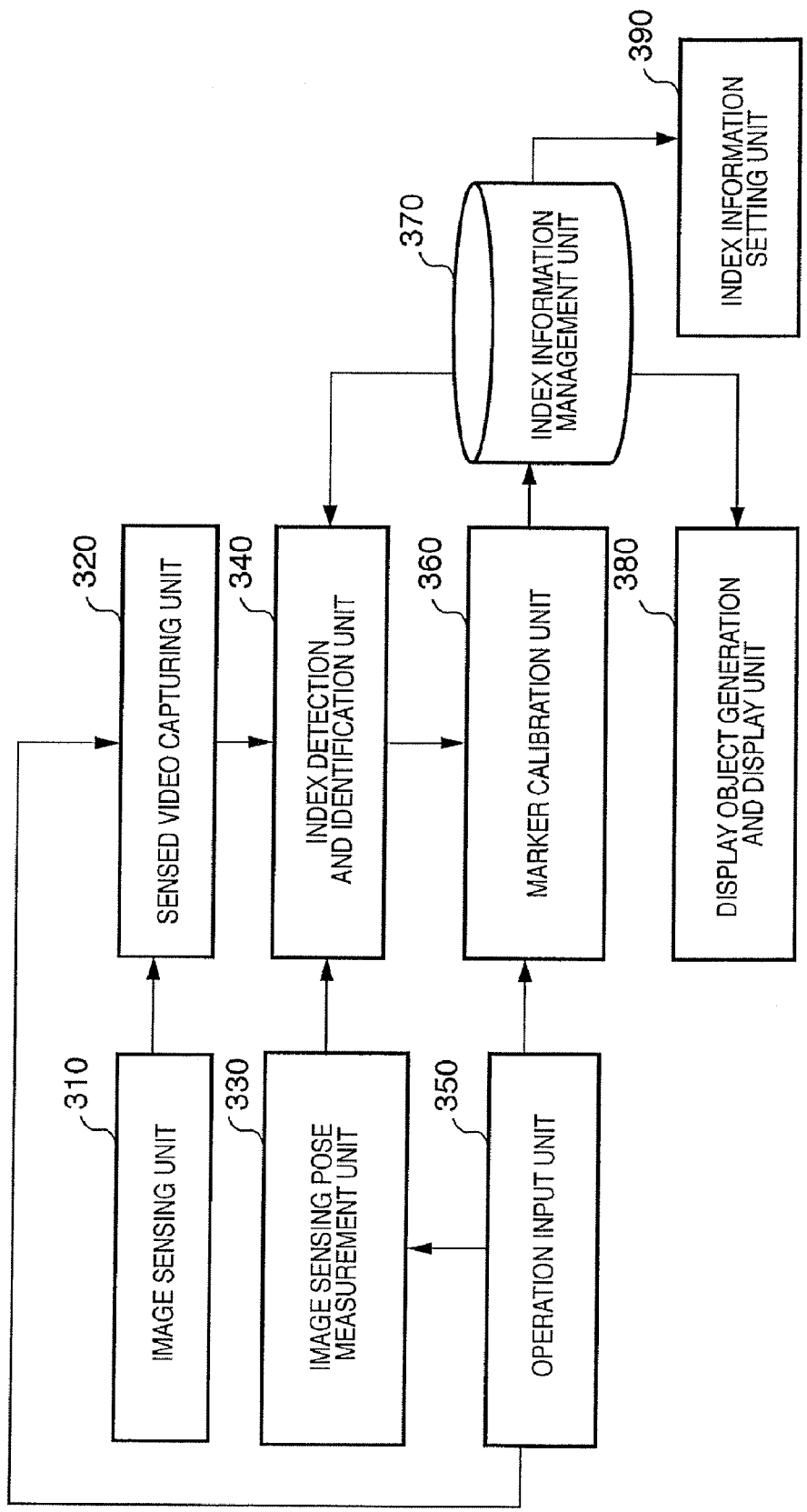

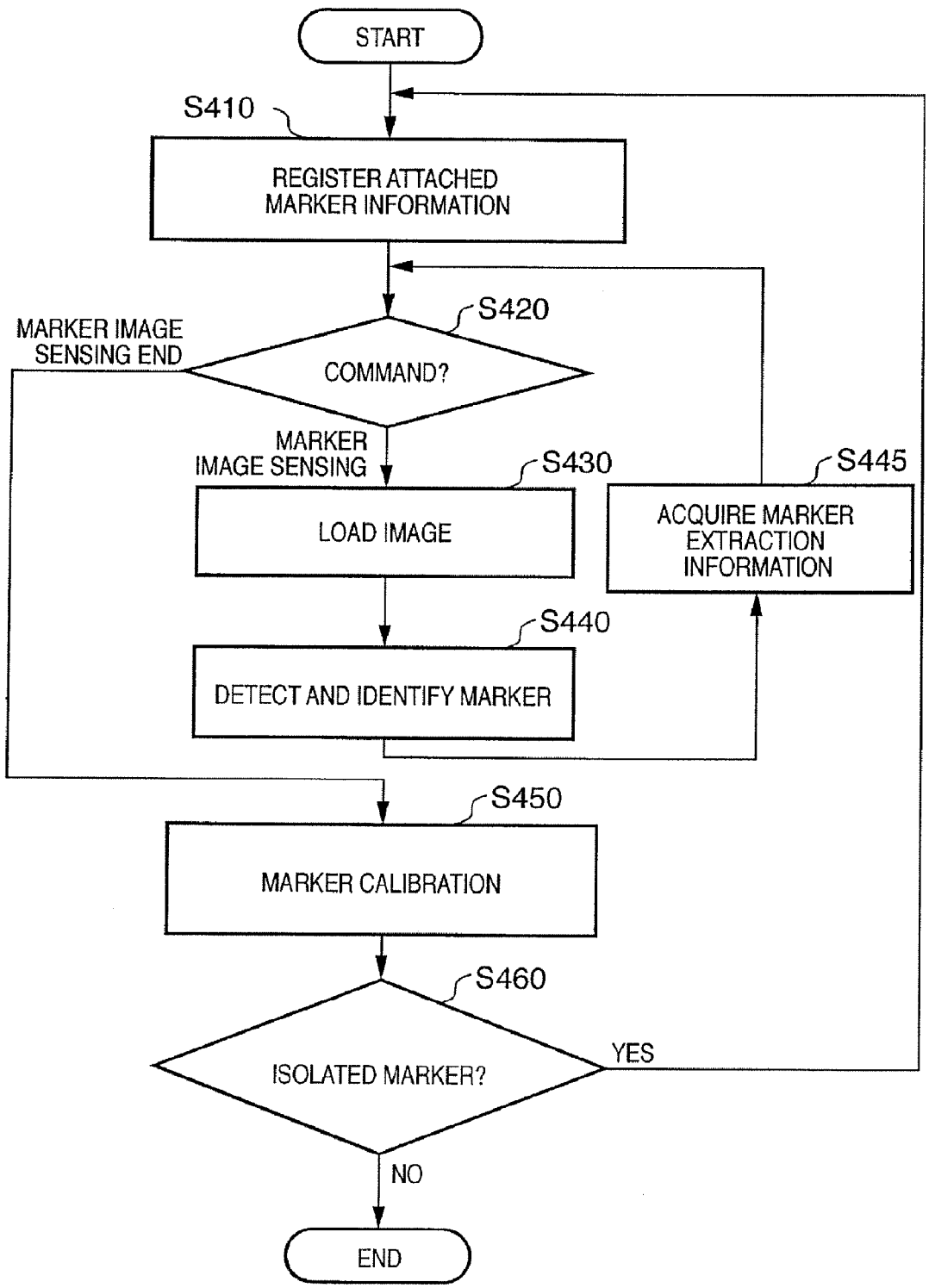

INDEX LAYOUT MEASUREMENT METHOD, POSITION AND ORIENTATION ESTIMATION METHOD, INDEX LAYOUT MEASUREMENT APPARATUS, AND POSITION AND ORIENTATION ESTIMATION APPARATUS

TECHNICAL FIELD

The present invention relates to a technique for measuring the positions and orientations of indices laid out in a physical space.

BACKGROUND ART

In recent years, studies about Mixed Reality (to be abbreviated as MR hereinafter) that aim at seamless merging of real and virtual spaces have been extensively made. Especially, of such MR techniques, an Augmented Reality (AR) technique that superimposes a virtual space in a physical space has received a lot of attention.

Display devices which allow the user to experience an MR space in correspondence with the motion of the head of the user can be classified into two systems depending on their implementation methods. One system is a video see-through system which superimposes an image of a virtual space (a virtual object, text information, and the like) rendered by computer graphics (to be abbreviated as CG hereinafter) generated according to the pose, which consists of position and orientation, of an image sensing device on an image of a physical space sensed by the image sensing device such as a video camera or the like. The other system is an optical see-through system which displays an image of a virtual space generated according to the pose of the viewpoint of a viewer on an optical see-through display mounted on the head of the viewer.

Applications of the AR technique to various fields such as an operation assistance that superimposes the conditions in the body onto the body surface of a patient, an architectural simulation that superimposes a virtual building on a blank space, an assembly assistance that superimposes the work sequence and the wiring state upon assembly, and the like are expected.

One of the most important problems in the AR technique is how accurately the physical space and virtual space are registered, and many conventional efforts have been done. The registration problem in AR amounts to a problem of obtaining the pose of an image sensing device in a scene (i.e., on a reference coordinate system) in case of the video see-through system. Likewise, that problem amounts to a problem of obtaining the pose of the viewpoint of the viewer or display in a scene in case of the optical see-through system.

As a method of solving the registration problem in the video see-through system, the following method is known. That is, a plurality of feature points (markers) whose coordinate (world coordinate) values in a three-dimensional (3D) space are known are arranged and are sensed by a camera, and the pose of the camera, which satisfy the relationship between the world coordinate values and the sensed image coordinate values of the markers, are calculated (see patent reference 1). As a method of solving the registration problem in the optical see-through system, it is a common practice to mount an image sensing device on an object to be measured (i.e., the head of the viewer or a display), to calculate the pose of this image sensing device by the same method as in the video see-through system, and to calculate the pose of the object to be measured based on the calculated pose of the image sensing device.

In general, if the image coordinate values of a plurality of points (three points or more theoretically, or six points or more for stable solution), whose 3D positions are known, on a sensed image are obtained, the pose of the camera viewpoint can be calculated based on the correspondence between the 3D positions and image coordinate values.

A method of calculating the pose of an image sensing device based on sets of the 3D coordinate values and image coordinate values of indices has been proposed in the field of photogrammetry, as described in non-patent references 1 and 2.

Furthermore, a method that uses a square-shaped index (to be referred to as a square index hereinafter) having a known size as an index has also been proposed (see non-patent references 3 and 4).

Moreover, a method that uses a combination of a square index and dot index as indices has been proposed (see non-patent reference 5).

The dot index has a merit that it can be set in a narrow place. The square index has merits of easy identification, and calculations of the pose of an image sensing device from only one index since one index has a large information volume. Hence, the dot index and square index can be used complementarily.

Based on an image sensed by an image sensing device using the aforementioned method, the pose of this image sensing device are conventionally acquired.

On the other hand, a six-degrees-of-freedom position and orientation sensor such as a magnetic sensor, ultrasonic sensor, or the like is attached to an image sensing device as an object to be measured, and the pose are measured using the sensor measurement result and the aforementioned detection of indices by image processing together. Since the output value of the sensor can be stably obtained although its precision changes depending on the measurement range, the method using the sensor and image processing together can improve robustness compared to the method using the image processing alone (see patent reference 2 and non-patent reference 6).

Since the conventional registration method using indices acquires the pose on a reference coordinate system of the image sensing device as an object to be measured, the position on the reference coordinate system in case of the dot index, and the pose on the reference coordinate system in case of the square index must be known. In case of the square index, the square index itself is normally used as a reference for a coordinate system without separately defining the reference coordinate system. However, when a plurality of square indices is used, the relative relationship among their poses (to be referred to as a layout relationship hereinafter) must be known. For this reason, the reference coordinate system is required to define the pose relationship among the plurality of indices.

The pose of each index on the reference coordinate system can be measured manually using a surveying tape and protractor, or using a surveying instrument. However, measurement is done using an image in consideration of precision and labor. The positions of the dot indices can be measured by a method called bundle adjustment. The bundle adjustment method is executed as follows. That is, many images of dot indices are sensed by an image sensing device, and the pose of the image sensing device that senses images, and the positions of the dot indices, are calculated by an iterative calculation so as to minimize the errors (projection errors) between the projection positions where the indices are actually observed on the images and projection positions calculated based on the pose of the image sensing device and the positions of the indices under the constraint conditions of three points, i.e., the position of the dot index in the physical space, the projection point of that dot index on an image, and the viewpoint of the image sensing device exist on a straight line.

A method of measuring the poses of a large number of square markers laid out in a 3D space has been proposed (see non-patent reference 7).

Also, a method of calculating the position and orientation of an image sensing device that senses images and the positions and orientations of square markers by an iterative calculations to minimize projection errors by sensing images of a large number of square markers laid out in a 3D space has been proposed (see non-parent reference 8).

In a measurement method using an image (to be referred to as vision-based marker calibration hereinafter), upon calculating the layout relationship among N indices (M1 to MN), when an arbitrary index Mi is sensed simultaneously with at least one index Mj (i ≠j) and markers sensed at the same time form a group, all markers must form one group. A practical example will be described below with reference to FIG. 1.

FIG. 1 shows a problem upon calculating the layout relationship between markers when two markers form one group, and two groups are sensed using cameras.

Referring to FIG. 1, reference numerals 101 and 102 denote cameras. The camera 101 senses an image of markers 101a and 101b, and the camera 102 senses an image of markers 102a and 102b. In FIG. 1, reference numeral 103 denotes an image which is sensed by the camera 101, and includes the markers 101a and 101b. On the other hand, reference numeral 104 denotes an image which is sensed by the camera 102 and includes the markers 102a and 102b.

According to the prior art, when the image 103 is used, the layout relationship between the markers 101a and 101b can be calculated. When the image 104 is used, the layout relationship between the markers 102a and 102b can be calculated. However, the layout relationship between the markers included in the different images, i.e., the layout relationship between the marker 101a in the image 103 and the marker 102a in the image 104, cannot be calculated.

To solve this problem, as a general device that allows sensing a broad range, a method using a camera with a wide field of view may be adopted. However, this method suffers a problem of a large influence of image distortion. Also, a method of sensing an image from afar may be used. However, a high-resolution image cannot be obtained. Therefore, it is difficult to calculate an accurate layout relationship.

When there are physical factors, e.g., when an obstacle exists between markers, markers have different orientations, and so forth, simultaneous image sensing itself is difficult to attain.

As described above, a large number of markers are laid out so that the layout relationship among all the markers can be calculated. However, laying out many markers may impair scenery, and upon MR experience, it is desirable to lay out a minimum required number of markers required for registration (see non-patent reference 9).

Patent reference 1: Japanese Patent Laid-Open No. 2000-041173

Patent reference 2: Japanese Patent Laid-Open No. 2002-228442

Non-patent reference 1: R. M. Haralick, C. Lee, K. Ottenberg, and M. Nolle: "Review and analysis of solutions of the three point perspective pose estimation problem", Int'l. J. Computer Vision, vol. 13, no. 3, pp. 331-356, 1994.

Non-patent reference 2: M. A. Fishler and R. C. Bolles: "Random sample consensus: a paradigm for model fitting with applications to image analysis and automated cartography", Comm. ACM, vol. 24, no. 6, pp. 381-395, 1981.

Non-patent reference 3: Junichi Rekimoto: "Augmented Reality using the 2D matrix code", Interactive system and software IV, Kindai kagaku sha, 1996.

Non-patent reference 4: Kato, M. Billinghurst, Asano, and Tachibana: "Augmented reality system and its calibration based on marker tracking", Transactions of the Virtual Reality Society of Japan, vol. 4, no. 4, pp. 607-616, 1999.

Non-patent reference 5: H. Kato, M. Billinghurst, I. Poupyrev, K. Imamoto and K. Tachibana: "Virtual object manipulation on a table-top AR environment", Proc. ISAR2000, pp. 111-119, 2000.

Non-patent reference 6: A. State, G. Hirota, D. T. Chen, W. F. Garrett and M. A. Livingston: "Superior augmented reality registration by integrating landmark tracking and magnetic tracking", Proc. SIGGRAPH'96, pp. 429-438, 1996.

Non-patent reference 7: G. Baratoff, A. Neubeck and H. Regenbrecht: "Interactive multi-marker calibration for augmented reality applications", Proc. ISMAR2002, pp. 107-116, 2002.

Non-patent reference 8: G. Baratoff, A. Neubeck and H. Regenbrecht: "Interactive multi-marker calibration for augmented reality applications", Proc. ISMAR2002, pp. 107-116, 2002.

Non-patent reference 9: G. Baratoff, A. Neubeck and H. Regenbrecht: "Interactive multi-marker calibration for augmented reality applications", Proc. ISMAR2002, pp. 107-116, 2002.

DISCLOSURE OF INVENTION

Problems that the Invention is to Solve

The present invention has been made in consideration of the aforementioned problems, and has as its object to provide a technique for obtaining the positions of respective indices using vision-based marker calibration even when indices are laid out so as not to impair scenery upon MR experience.

Means of Solving the Problems

In order to achieve the object of the present invention, an index layout measurement method according to the present invention comprises, for example, the following arrangement.

That is, there is provided an index layout measurement method of measuring a relative layout relationship between a first index or index group which exists in a given first region in a physical space and a second index or index group which exists in a second region even when the first index or index group which exists in the first region and the second index or index group which exists in the second region have a layout or condition in which an image thereof cannot be sensed under a condition that suffices to measure a relative layout relationship in a method of measuring a relative layout relationship between indices by sensing an image of a plurality of indices in a physical space by a movable image sensing device, characterized by comprising:

a first image sensing step of sensing an image so as to simultaneously include both some or all of the first index/index group and an auxiliary index which is temporarily laid out in the physical space and a position and orientation in a three-dimensional space of which can be defined;

a second image sensing step of sensing an image so as to simultaneously include both some or all of the second index/index group and the auxiliary index; and a layout calculation step of calculating a relative layout relationship among the first index/index group, the auxiliary index, and the second index/index group from one or a plurality of images obtained by performing the first image sensing step once or repeating it a plurality of number of times, and one or a plurality of images obtained by performing the second image sensing step once or repeating it a plurality of number of times.

In order to achieve the object of the present invention, an index layout measurement method according to the present invention comprises, for example, the following arrangement.

That is, there is provided an index layout measurement method of measuring a relative layout relationship between a first index or index group which exists in a given first region in a physical space and a second index or index group which exists in a second region even when the first index or index group which exists in the first region and the second index or index group which exists in the second region have a layout or condition in which an image thereof cannot be sensed under a condition that suffices to measure a relative layout relationship in a method of measuring a relative layout relationship between indices by sensing an image of a plurality of indices in a physical space by a movable image sensing device, characterized by comprising:

a first image sensing step of sensing an image so as to simultaneously include both some or all of the first index/index group and an auxiliary index which is temporarily laid out in the physical space and a position and orientation in a three-dimensional space of which can be defined;

a first layout calculation step of calculating a relative layout relationship between the first index/index group and the auxiliary index from one or a plurality of images obtained by performing the first image sensing step once or repeating it a plurality of number of times;

a second image sensing step of sensing an image so as to simultaneously include both some or all of the second index/index group and the auxiliary index;

a second layout calculation step of calculating a relative layout relationship between the second index/index group and the auxiliary index from one or a plurality of images obtained by performing the second image sensing step once or repeating it a plurality of number of times; and a third layout calculation step of calculating a relative layout relationship between the first index/index group and the second index/index group from results of the first layout calculation step and the second layout calculation step.

In order to achieve the object of the present invention, a position and orientation estimation method according to the present invention comprises, for example, the following arrangement.

That is, there is provided a position and orientation estimation method of estimating a position and/or orientation of a movable image sensing device based on indices which exist in a physical space, characterized by comprising:

a first image sensing step of sensing an image so as to simultaneously include both some or all of a first index/index group and an auxiliary index which is temporarily laid out in the physical space and a position and orientation in a three-dimensional space of which can be defined;

a first layout calculation step of calculating a relative layout relationship between the first index/index group and the auxiliary index from one or a plurality of images obtained by performing the first image sensing step once or repeating it a plurality of number of times;

a second image sensing step of sensing an image so as to simultaneously include both some or all of a second index/index group and the auxiliary index;

a second layout calculation step of calculating a relative layout relationship between the second index/index group and the auxiliary index from one or a plurality of images obtained by performing the second image sensing step once or repeating it a plurality of number of times;

a third layout calculation step of calculating a relative layout relationship between the first index/index group and the second index/index group from results of the first layout calculation step and the second layout calculation step; and an image sensing device position and orientation estimation step of estimating the position and orientation of the image sensing device using layouts of the first index/index group and the second index/index group without using the auxiliary index.

In order to achieve the object of the present invention, an index layout measurement apparatus according to the present invention comprises, for example, the following arrangement.

That is, there is provided an index layout measurement apparatus for measuring a relative layout relationship between a first index or index group which exists in a given first region in a physical space and a second index or index group which exists in a second region even when the first index or index group which exists in the first region and the second index or index group which exists in the second region have a layout or condition in which an image thereof cannot be sensed under a condition that suffices to measure a relative layout relationship in a method of measuring a relative layout relationship between indices by sensing an image of a plurality of indices in a physical space by a movable image sensing device, characterized by comprising:

first image sensing unit adapted to sense an image so as to simultaneously include both some or all of the first index/index group and an auxiliary index which is temporarily laid out in the physical space and a position and orientation in a three-dimensional space of which can be defined;

second image sensing unit adapted to sense an image so as to simultaneously include both some or all of the second index/index group and the auxiliary index; and layout calculation unit adapted to calculate a relative layout relationship among the first index/index group, the auxiliary index, and the second index/index group from one or more images obtained by sensing once or more by said first image sensing unit, and one or more images obtained by sensing once or more by said second image sensing unit.

In order to achieve the object of the present invention, an index layout measurement apparatus according to the present invention comprises, for example, the following arrangement.

That is, there is provided an index layout measurement apparatus for measuring a relative layout relationship between a first index or index group which exists in a given first region in a physical space and a second index or index group which exists in a second region even when the first index or index group which exists in the first region and the second index or index group which exists in the second region have a layout or condition in which an image thereof cannot be sensed under a condition that suffices to measure a relative layout relationship in a method of measuring a relative layout relationship between indices by sensing an image of a plurality of indices in a physical space by a movable image sensing device, characterized by comprising:

first image sensing unit adapted to sense an image so as to simultaneously include both some or all of the first index/ index group and an auxiliary index which is temporarily laid out in the physical space and a position and orientation in a three-dimensional space of which can be defined;

first layout calculation unit adapted to calculate a relative layout relationship between the first index/index group and the auxiliary index from one or more images obtained by sensing once or more by said first image sensing unit;

second image sensing unit adapted to sense an image so as to simultaneously include both some or all of the second index/index group and the auxiliary index;

second layout calculation unit adapted to calculate a relative layout relationship between the second index/index group and the auxiliary index from one or more images obtained by sensing once or more by said second image sensing unit; and third layout calculation unit adapted to calculate a relative layout relationship between the first index/index group and the second index/index group from results of said first layout calculation unit and said second layout calculation unit.

In order to achieve the object of the present invention, a position and orientation estimation apparatus according to the present invention comprises, for example, the following arrangement.

That is, there is a position and orientation estimation apparatus for estimating a position and/or orientation of a movable image sensing device based on indices which exist in a physical space, characterized by comprising:

first image sensing unit adapted to sense an image so as to simultaneously include both some or all of a first index/index group and an auxiliary index which is temporarily laid out in the physical space and a position and orientation in a three-dimensional space of which can be defined;

first layout calculation unit adapted to calculate a relative layout relationship between the first index/index group and the auxiliary index from one or more images obtained by sensing once or more by said first image sensing unit;

second image sensing unit adapted to sense an image so as to simultaneously include both some or all of a second index/index group and the auxiliary index;

second layout calculation unit adapted to calculate a relative layout relationship between the second index/index group and the auxiliary index from one or more images obtained by sensing once or more by said second image sensing unit;

third layout calculation unit adapted to calculate a relative layout relationship between the first index/index group and the second index/index group from results of said first layout calculation unit and said second layout calculation unit; and image sensing device position and orientation estimation unit adapted to estimate the position and orientation of the image sensing device using layouts of the first index/index group and the second index/index group without using the auxiliary index.

EFFECTS OF THE INVENTION

According to the arrangements of the present invention, even when indices are laid out so as not to influence scenery, the positions of respective indices can be obtained using the vision-based marker calibration method.

Other features and advantages of the present invention will be apparent from the following description taken in conjunction with the accompanying drawings. Note that the same reference numerals denote the same or similar parts throughout the drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2A shows various markers laid out in a physical space;

FIG. 3 is a block diagram showing the functional arrangement of a system according to an embodiment of the present invention;

FIG. 4 is a flowchart of processing for calculating the layout poses (positions and orientations) of respective registration markers laid out in the physical space;

BEST MODE FOR CARRYING OUT THE INVENTION

The present invention will be described in detail hereinafter by way of its preferred embodiments with reference to the accompanying drawings.

First Embodiment

This embodiment calculates the layout relationship among respective indices using a set of images of a physical space on which a plurality of indices are laid out in accordance with the vision-based marker calibration. These indices are used to register the physical space and a virtual space as they are used in MR and AR technical fields.

This embodiment newly lays out a "bridging index" to calculate the layout poses of the indices. This embodiment uses a "marker" as an "index". In the following description, an index which is not the bridging index will be called a "registration marker" to be distinguished from the bridging index, and the bridging index will be called a "bridging marker". In the following description, a case simply called a "marker" includes both the registration marker and bridging marker.

In the following embodiment, a description will be given using artificially laid-out markers. However, natural features which originally exist in the physical world may be used as indices. On the other hand, the bridging marker is an artificially laid-out index since the user artificially lays it out for marker calibration.

Figure 2B:
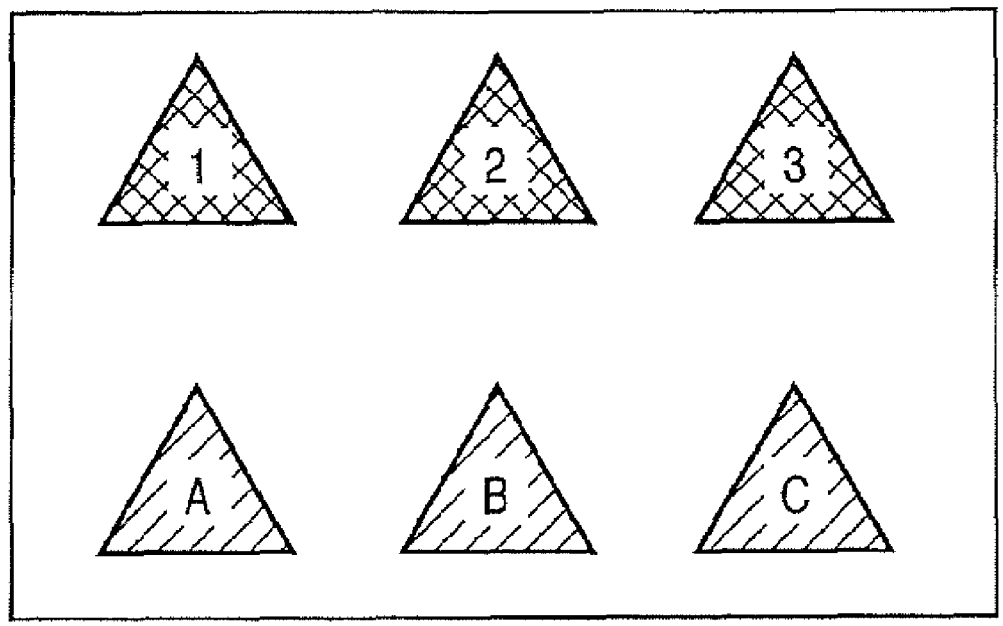
FIG. 2B shows various markers laid out in the physical space.
Figure 2C:
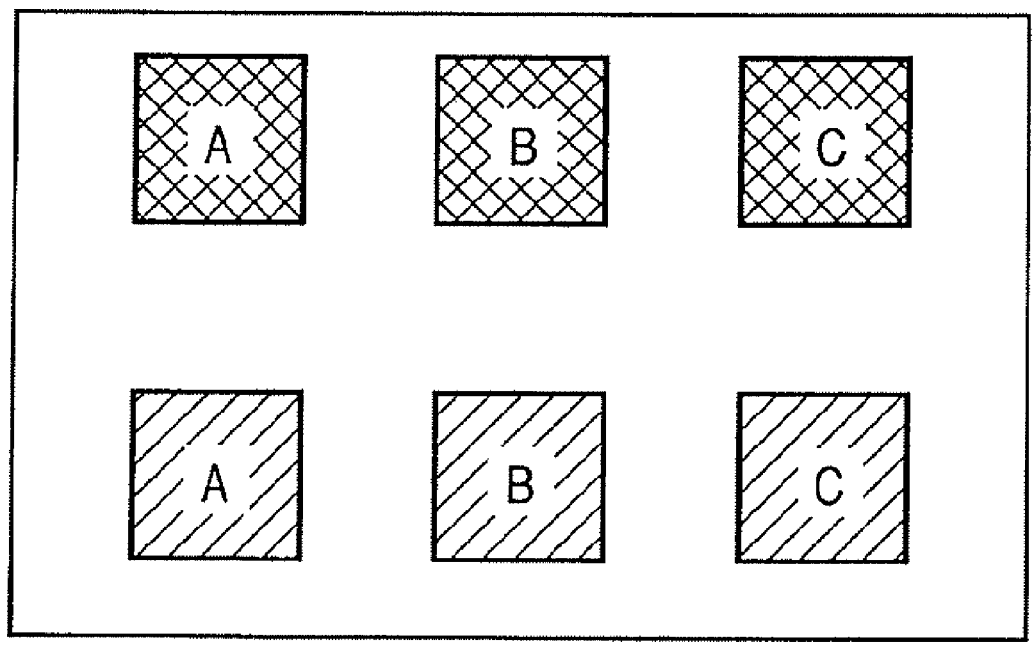
FIG. 2C shows various markers laid out in the physical space.

FIGS. 2A to 2C show markers laid out in the physical space. FIG. 2A shows dot markers which have different colors so as to be identified and detected on an image obtained by sensing the physical space, and all have a circular shape. The position of the dot marker in an image uses the position of the center of gravity of a dot marker region in the image.

FIGS. 2B and 2C show polygonal indices. FIG. 2B shows triangular markers, and FIG. 2C shows rectangular markers. A color frame bounds the polygonal index to allow easy detection on an image, and the interior of the frame defines an index. Furthermore, different patterns are embedded in the polygons. For example, by making template matching of the interior of a given marker, a pattern unique to that marker, which is laid out inside each index can be specified, thus identifying each individual marker.

This embodiment can use any types of markers as the registration markers and bridging marker. If markers used as the registration markers and bridging marker are determined, information of each individual marker must be registered in a computer (to be described later).

The bridging marker will be further explained. The bridging marker is laid out in the physical space to calculate the layout relationship between the registration marker in one image and that in the other image. In other words, the function of the bridging marker is to calculate the pose relationship between coordinate system A to which the registration marker in one image belongs and coordinate system B to which the registration marker on the other image belongs. In order to implement this function, the pose of the bridging marker on coordinate system A and those on coordinate system B must be calculated. If a marker which is given three identifiable points not defining an identical straight line (e.g., a triangular index whose vertices are identifiable) is used, its pose can be calculated.

When a condition that "a bridging marker exists on a plane which is known on both coordinate system A and coordinate system B" is given, even if the bridging marker is an index having only two identifiable points, its pose on coordinate system A and those on coordinate square B can be calculated. Therefore, the bridging marker may have a shape having two identifiable feature points. This embodiment uses a triangular index whose direction is identifiable as the bridging marker so that the index can be used as the bridging marker without any special constraint condition.

FIG. 3 is a block diagram showing the functional arrangement of a system according to this embodiment.

An image sensing unit 310 serves as a camera which senses an image of the physical space. Note that the image sensing unit 310 may be of a type that senses still images of the physical space a plurality of number of times, or of a type that senses a moving image of the physical space.

An image sensing pose measurement unit 330 is attached to the image sensing unit 310, measures the pose of the image sensing unit 310, and outputs the measurement result to an index detection and identification unit 340. For example, when the image sensing pose measurement unit 330 comprises a magnetic sensor, it measures the self pose on a coordinate system (sensor coordinate system) which has the position of a magnetic source as an origin, and three axes perpendicular to each other at the origin as x-, y-, and z-axes. A sensor which can be applied to the image sensing pose measurement unit 330 is not limited to the magnetic sensor, and sensors of other types such as an optical sensor and the like may be applied. Furthermore, a gyro or the like which measures three degrees of freedom of only an orientation may be applied in place of the sensor which measures six degrees of freedom.

A sensed video capturing unit 320 captures an image sensed by the image sensing unit 310, and outputs it to the index detection and identification unit 340.

The index detection and identification unit 340 executes processing for detecting image coordinate values of respective markers (including the registration markers and bridging marker) included in the image received from the sensed video capturing unit 320, and also processing for uniquely identifying the respective markers. Each marker is identified using information unique to that marker registered in an index information management unit 370. The index detection and identification unit 340 then outputs a set of an identifier of each identified marker i, the image coordinate value of marker i on the image, an identifier (e.g., a frame number) unique to that image, and pose information of the image sensing unit 310 received from the image sensing pose measurement unit 330 to a marker calibration unit 360. The index detection and identification unit 340 executes such processes for each image received from the sensed video capturing unit 320.

The marker calibration unit 360 executes processing for calculating the layout information (layout positions or layout poses) of the respective registration markers laid out in the physical space. Upon completion of calculations of the layout information of registration marker i, the marker calibration unit 360 registers a set of the calculated layout information and the identifier required to identify this registration marker i in the index information management unit 370.

The marker calibration unit 360 calculates the layout information of each marker using both the registration markers and bridging marker and, e.g., the bundle adjustment method or the like, so as to calculate the layout information of the registration marker. That is, the marker calibration unit 360 calculates the position information of registration marker i using the registration markers and bridging marker without any distinction between them.

An operation input unit 350 inputs an operation instruction to the image sensing pose measurement unit 330, sensed video capturing unit 320, and index detection and identification unit 340, which operate upon reception of the operation instruction from the operation input unit 350.

The index information management unit 370 registers information required to identify each marker (the identifier unique to each marker, marker shape, feature (a letter, symbol, or the like described within the frame) in the marker, and marker type information (registration marker or bridging marker)), as described above. Also, the index information management unit 370 registers the set of the layout information of each registration marker and the identifier used to identify this registration marker, output from the marker calibration unit 360.

An index information setting unit 390 deletes the information of the bridging marker using the marker type information from the index information updated by the marker calibration unit 360, and generates and sets index information required for registration in MR or AR. The bridging marker is laid out at the time of marker calibration, but is deleted upon MR or AR experience. Therefore, the registration processing upon execution of MR or AR does not require any information of the bridging marker. According to this embodiment, the index information setting unit 390 can automatically delete the information of the bridging marker, thus reducing the load on the user.

A display object generation and display unit 380 displays data of sets which are registered in the index information management unit 370 by the marker calibration unit 360, and an isolated point marker check result. A display mode is not particularly limited.

Figure 6:
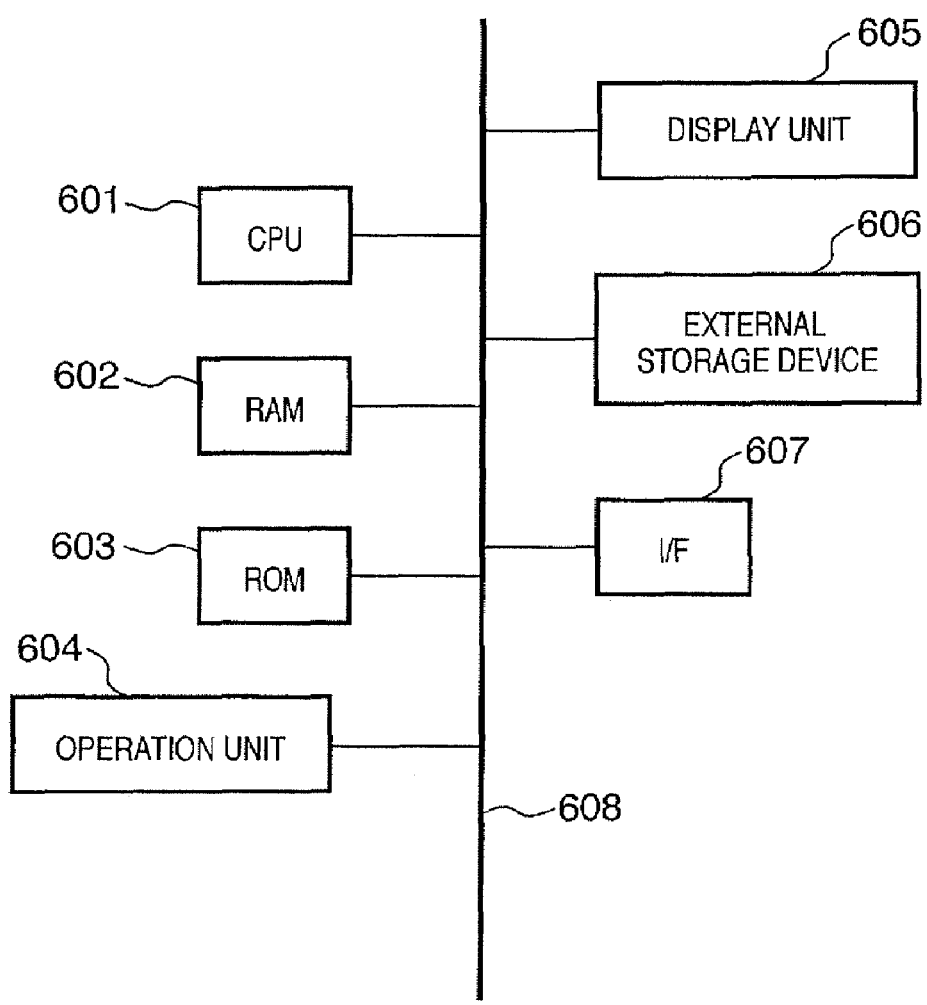
FIG. 6 is a block diagram showing the basic arrangement of a computer having functions of an operation input unit 350, video capturing unit 320, index detection and identification unit 340, marker calibration unit 360, index information management unit 370, and display object generation and display unit 380.

FIG. 6 is a block diagram showing the basic arrangement of a computer having the functions of the operation input unit 350, video capturing unit 320, index detection and identification unit 340, marker calibration unit 360, index information management unit 370, and display object generation and display unit 380.

Reference numeral 601 denotes a CPU, which controls the overall computer using programs and data stored in a RAM 602 and ROM 603, and executes respective processes (to be described later) to be implemented by the computer.

Reference numeral 602 denotes a RAM which comprises an area for temporarily storing programs and data loaded from an external storage device 606, and also a work area used by the CPU 601 upon execution of the respective processes.

Reference numeral 603 denotes a ROM which stores setting data, a boot program, and the like of this computer.

Reference numeral 604 denotes an operation unit which comprises a keyboard, mouse, and the like. When the operator of this computer operates the operation unit 604, the operation unit 604 can input various instructions to the CPU 601.

Reference numeral 605 denotes a display unit which comprises a CRT, liquid crystal display, or the like, and can display the processing result of the CPU 601 by means of images, text, and the like.

Reference numeral 606 denotes an external storage device which serves as a large-capacity information storage device such as a hard disk drive device or the like. The external storage device 606 saves an OS (operating system), programs and data for making the CPU 601 execute the respective processes (to be described later) to be implemented by the computer, and the like. Some or all of these programs and data are loaded onto the RAM 602 under the control of the CPU 601, and are to be processed by the CPU 601.

Reference numeral 607 denotes an I/F which can connect the image sensing unit 310 and image sensing pose measurement unit 330. An image sensed by the image sensing unit 310, and the pose information of the image sensing unit 310 measured by the image sensing pose measurement unit 330 are input to this computer via the I/F 607.

Reference numeral 608 denotes a bus which interconnects the aforementioned units.

Figure 7:
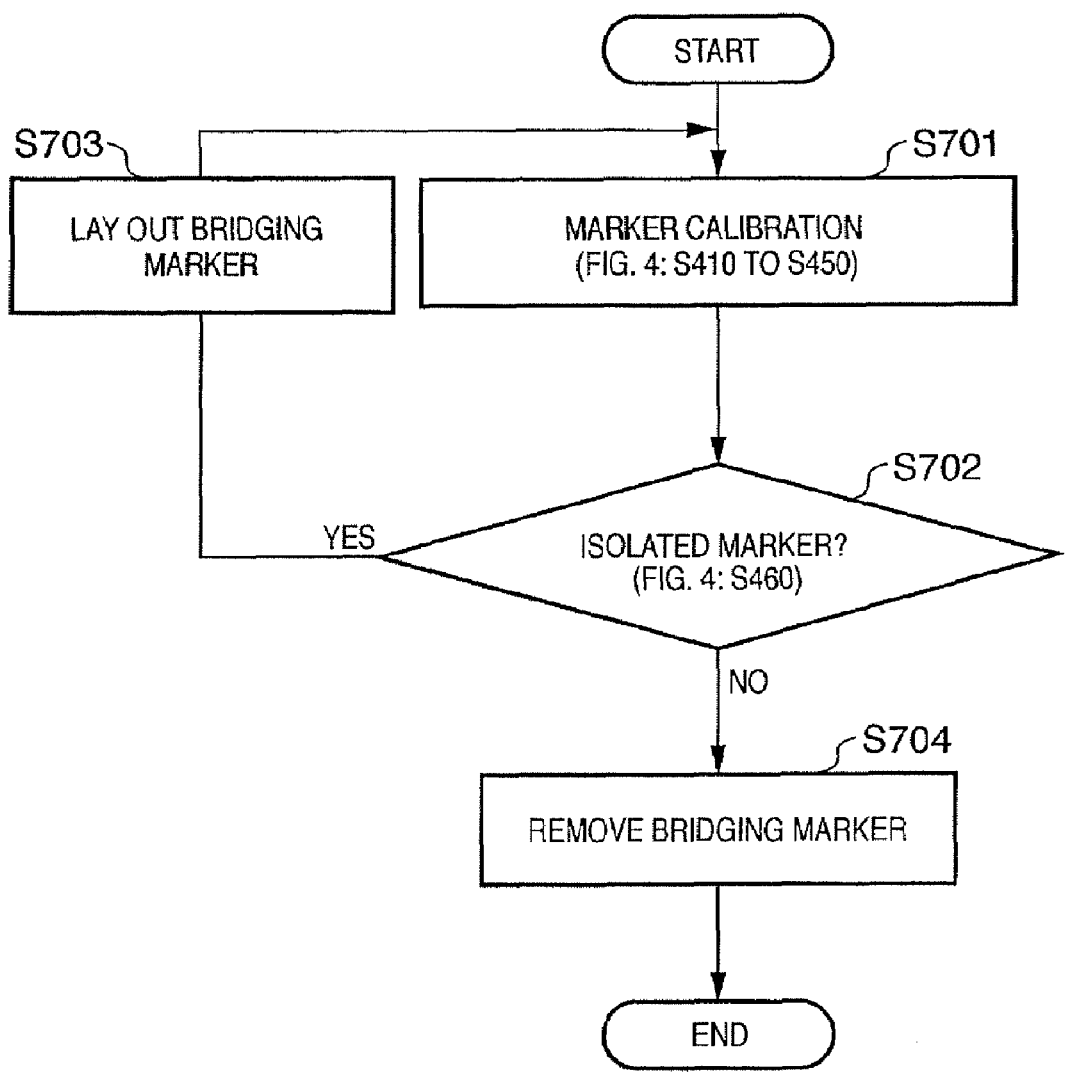
FIG. 7 is a flowchart of the operation for calculating the layout poses of registration markers laid out in the physical space.

The operation for calculating the layout poses of the respective registration markers laid out in the physical space will be described below using FIG. 7 that shows the flowchart of this operation. In the flowchart of FIG. 7, the computer with the above arrangement executes the processing in step S701, but the operator (or user) performs processes (operations) in other steps.

The computer executes marker calibration processing (corresponding to processes in steps S410 to S450 in FIG. 4) (step S701).

It is checked based on the marker calibration result in step S701 if the registration marker as an isolated point (isolated marker) still remains (step S702). Furthermore, the check result is displayed. More specifically, upon displaying the registered set data, display for distinguishing the isolated point marker (color-coding or marking) is made. The user can easy recognize an isolated marker by confirming this display.

Note that the bridging marker is excluded from objects to be checked to see if it is an isolated marker. The reason for this is that the bridging marker is complementarily used to calculate the layout information of each registration marker, and is not used upon AR experience. Therefore, no problem is posed if the bridging marker is an isolated marker.

Figure 1:
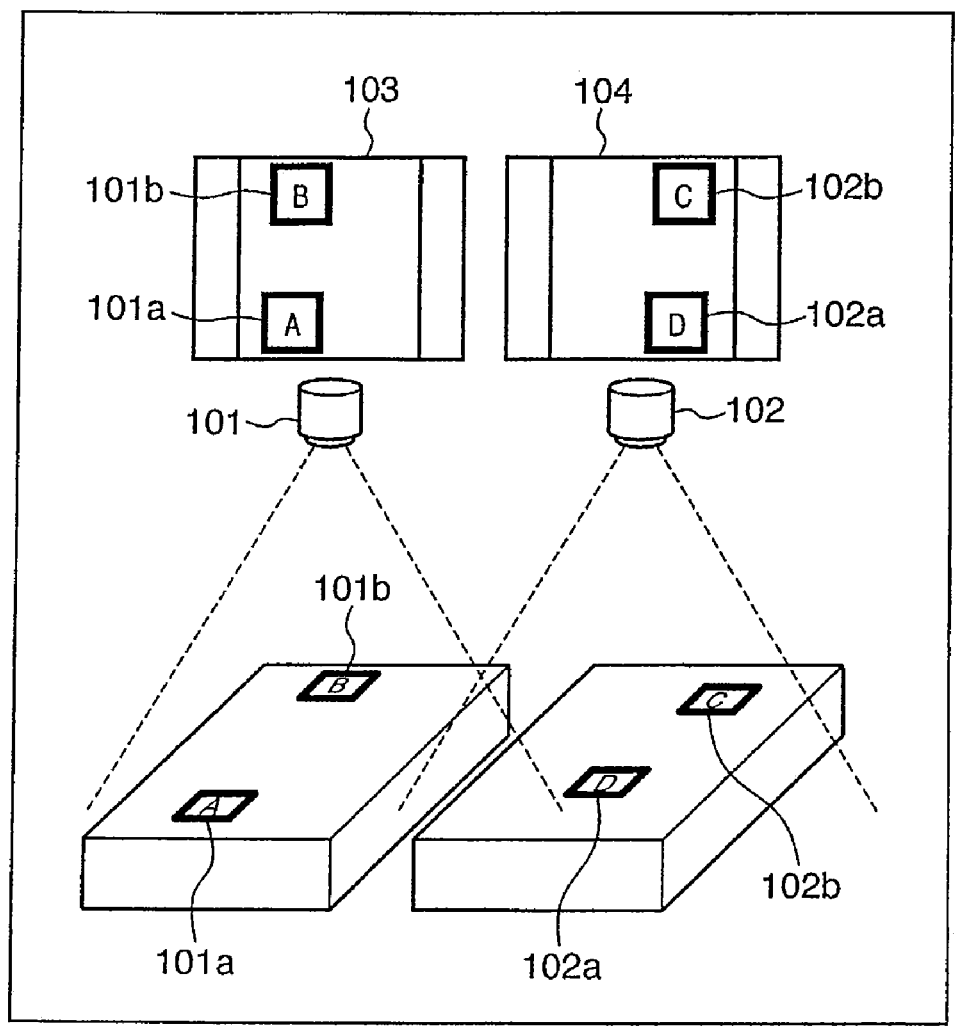
FIG. 1 shows a problem upon calculating the layout relationship among markers when two markers form one group and images of two groups are sensed by cameras.

The isolated marker is a registration marker which does not have any common coordinate system. For example, in case of FIG. 1, the markers 101*a* and 101*b* are defined by the first coordinate system, and the markers 102*a* and 102*b* are defined by the second coordinate system in the marker calibration. In this case, since the first and second coordinate systems are independent coordinate systems, when the first coordinate system is considered as a reference coordinate system, the markers 102*a* and 102*b* defined by the second coordinate system are determined as isolated markers. By contrast, in case of FIG. 5, the markers 101*a*, 101*b*, 102*a*, and 102*b*, and a marker 505 are defined by an identical coordinate system. Therefore, in case of FIG. 5, it is determined that no isolated marker remains.

When the registration markers which become isolated markers still remain, since they result from a small number of images of the physical space or lack of the bridging marker, the bridging marker is laid out to connect the isolated markers to non-isolated markers (step S703). After that, the operations in step S701 and the subsequent steps are repeated.

If no registration markers as isolated points remain, the bridging marker laid out in step S703 is removed (step S704).

In this manner, the bridging marker is laid out only upon making the marker calibration. After the marker calibration is completed, the bridging marker is removed.

The processing in step S701 executed by the computer having the above arrangement, i.e., the processing for calculating the layout poses of the respective registration markers laid out in the physical space will be described below using FIG. 4 that shows the flowchart of this processing. Note that programs and data for making the CPU 601 execute the processing according to the flowchart of FIG. 4 are saved in the external storage device 606, and are loaded onto the RAM 602 under the control of the CPU 601. When the CPU 601 executes processing using these programs and data, this computer implements processes to be described below.

The CPU 601 registers information associated with each marker laid out in the physical space in the external storage device 606 (step S410). As a registration method, for example, the display unit 380 displays a GUI used to register information associated with each marker laid out in the physical space on its display screen, and the operator operates the operation unit 604 to input the information associated with each marker. When the operator inputs an input completion instruction from the operation unit 604 by his or her operation, the CPU 601 detects this instruction in step S410, and registers the information associated with each marker input via the GUI in the external storage device 606.

Note that the information associated with each marker includes the identifier (e.g., ID) unique to that marker, marker shape, feature (a letter, symbol, or the like described within the frame) in the marker, and marker type information (registration marker or bridging marker), and the CPU 601 registers sets of these pieces of information in the external storage device 606 in correspondence with respective markers laid out in the physical space.

Referring back to FIG. 4, the CPU 601 accepts an operation instruction input from the operation unit 604 (step S420). Upon detection of an instruction to sense an image of the physical space, the process advances to step S430, and the CPU 601 temporarily stores an image input from the image sensing unit 310 in the RAM 602 (step S430). The CPU 601 then executes processing for identifying respective markers included in this image, and specifying the coordinate positions of the respective markers in the image (step S440).

Note that the CPU 601 registers the identification result of each marker (the identifier of the identified marker), the image coordinate value of that marker, and the (approximate) pose information of the image sensing unit 310 acquired from the image sensing pose measurement unit 330 in the external storage device 606 as detection information in association with each other (step S445). In this way, the CPU 601 can register the detection information of each of the markers included in the image acquired in step S430 in the external storage device 606.

The process returns to step S420, and the CPU 601 waits for the next operation instruction. On the other hand, if the CPU 601 detects input of an operation instruction indicating that the image sensing operation of the physical space ends, and marker calibration to be described below is to be executed, via the operation unit 604, the process advances to step S450 to calculate the layout information of each of the registration markers laid out in the physical space. That is, the CPU 601 executes so-called marker calibration processing to be described below (step S450).

In order to execute this processing, the CPU 601 uses the (approximate) pose information of the image sensing unit 310 acquired from the image sensing pose measurement unit 330. The pose, "position and orientation," may be those on a world coordinate system (a coordinate system which has one point in the physical space as an origin, and has three axes perpendicular to each other at this origin as x, y, and z), or may be converted into those on any coordinate systems as needed according to the calculation contents.

In the marker calibration processing, the CPU 601 executes processing for calculating the layout poses by, e.g., bundle adjustment using sets of the obtained identification results (the identifiers of the identified markers), and image coordinate values of the respective markers and the pose information of the image sensing device at the time of sensing this image, and sends the result to the index information management unit 470.

Figure 5:
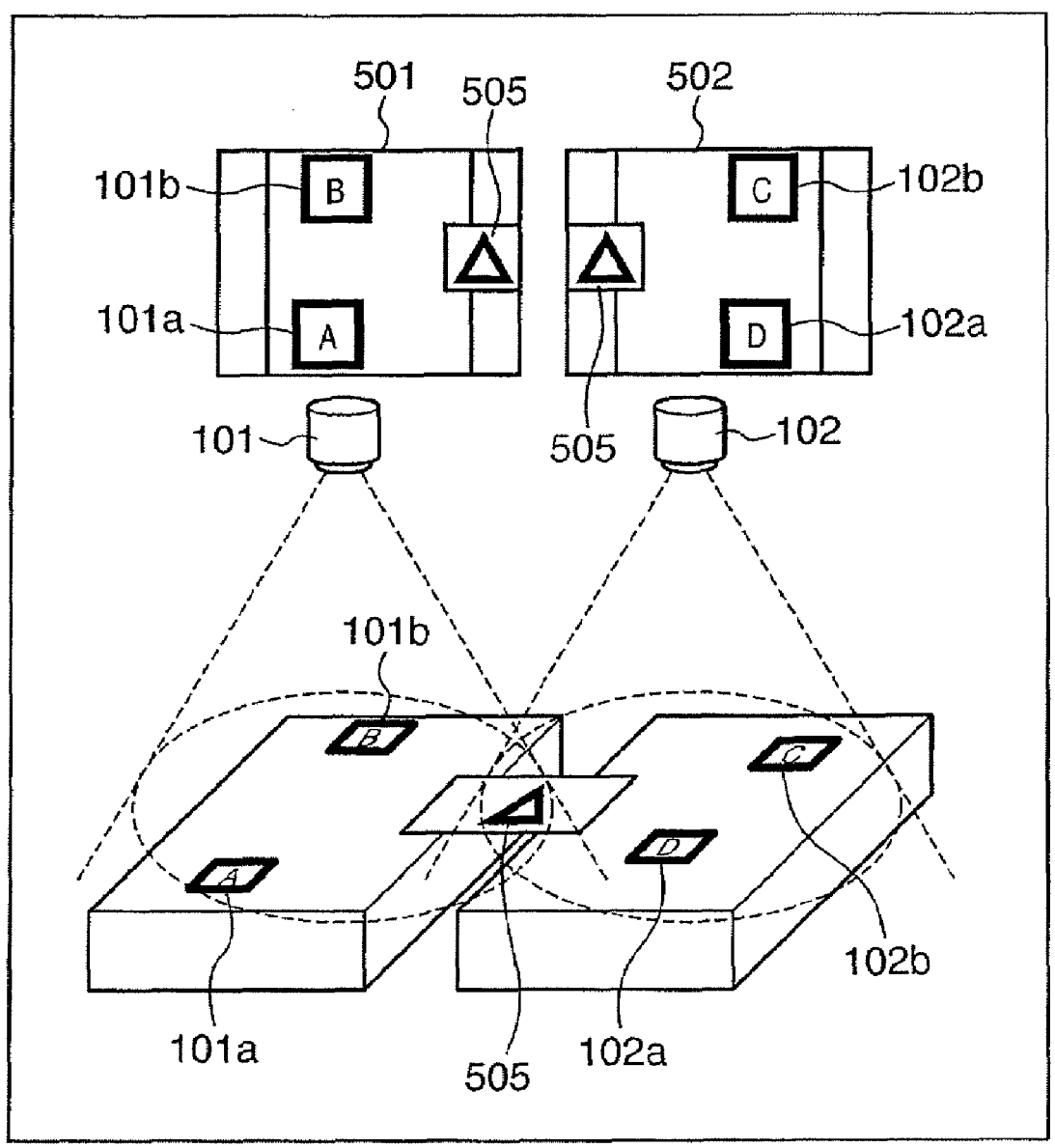
FIG. 5 shows a state wherein respective sensed images include a bridging marker in common upon sensing an image of the physical space on which the bridging marker is laid out in addition to registration markers using two cameras.

FIG. 5 shows a state wherein an identical bridging marker appears in two sensed images upon sensing, from two poses, an image of the physical space on which the bridging marker is laid out in addition to the registration markers. Note that the same reference numerals in FIG. 5 denote the same parts as in FIG. 1, and a detailed description thereof will be omitted.

As shown in FIG. 5, the cameras 101 and 102 obtain sensed images 501 and 502 by sharing a bridging marker 505. Note that the cameras 101 and 102 may use different cameras upon sensing images.

Then, the CPU 601 executes processing for registering sets of the marker identifiers and marker layout poses obtained by such processing in the external storage device 606.

In this manner, the layout poses of the registration markers laid out in the physical space can be calculated.

As described above, upon calculating the layout poses of the registration markers according to this embodiment, when the number of registration markers is small, and these markers are sparsely laid out, the layout positions of the registration markers can be calculated by laying out such bridging marker. Note that the bridging marker is laid out/projected up calculating the layout of the registration markers, and are removed upon MR experience. Hence, no problem about destroying of scenery is posed.

In this embodiment, the marker type information is used as index information so as to distinguish the registration marker and bridging marker from each other. However, the registration marker and bridging marker may be distinguished from each other using other methods. For example, the bridging marker may use a marker having a specific shape different from the registration marker. Also, both the registration marker and bridging marker may be defined as those having the same shape (e.g., triangular markers), and they may be distinguished from each other using IDs. In this manner, any other embodiments may be adopted as long as the registration marker and bridging marker can be registered in the computer to be distinguished from each other.

[First Modification]

This modification will exemplify marker calibration processing by a method different from the first embodiment as a modification of the first embodiment. That is, the marker calibration processing according to this embodiment executes processing for calculating the layout poses of respective markers (and those of the image sensing unit 310 upon sensing an image) by the bundle adjustment using the image coordinate values of the respective markers included in one arbitrary image (this image will be referred to as a reference image hereinafter).

One of the registration markers whose layout poses are calculated will be referred to as a "first registration marker" hereinafter. Since the reference image also includes a bridging marker, the layout pose of this bridging marker has already been obviously calculated. Note that the bridging marker included in the reference image will be referred to as a "reference bridging marker" hereinafter. Also, let T1 be the layout positional relationship between the layout pose of the first registration marker, and those of the reference bridging marker calculated from the reference image.

The following processing is executed upon calculating the layout poses of respective registration markers included in another image (to be referred to as a different image hereinafter) including this reference bridging marker. The layout poses of respective markers are calculated by, e.g., the bundle adjustment using the image coordinate values of the markers included in the different image. However, the calculated layout poses are defined based on a coordinate system that the markers included in this different image follow. In this embodiment, the layout poses of all the registration markers are standardized to those which follow a coordinate system (to be referred to as a reference coordinate system hereinafter) to which the first registration marker belongs.

Hence, in such case, the layout pose relationship between the layout poses of the registration markers calculated from the different image and the reference bridging marker in the different image can be corrected using an inverse transformation matrix of a matrix indicating T1. As a result, the layout poses of the registration markers calculated from the different image follow the reference coordinate system, and the layout pose relationship between the registration markers calculated from the different image and the first registration marker can be calculated.

By applying such processing to respective images, the layout poses of respective registration markers on the coordinate system to which the first registration marker belongs can be calculated.

Hence, in order to implement such processing, respective sensed images must be taken so that any of images include one or more bridging markers of those included in a given image.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flowcharts.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2005-026879, filed Feb. 2, 2005, which is hereby incorporated by reference herein in its entirety.

The invention claimed is:

1. An index layout measurement method of measuring a relative layout relationship between a first index or index group which exists in a first region in a physical space and a second index or index group which exists in a second region in the physical space by sensing an image of a plurality of indices in the physical space by a movable image sensing device, said method comprising: using a processor to perform
 a first image sensing step of sensing an image so as to simultaneously include some or all of the first index/index group and an auxiliary index which is temporarily laid out in the physical space and a position and orientation in a three-dimensional space of which can be defined;
 a second image sensing step of sensing an image so as to simultaneously include some or all of the second index/index group and the auxiliary index;
 a layout calculation step of calculating a relative layout relationship among the first index/index group, the auxiliary index, and the second index/index group from one or a plurality of images obtained by performing the first image sensing step once or repeating it a plurality of number of times, and one or a plurality of images obtained by performing the second image sensing step once or repeating it a plurality of number of times; and
 an execution step of repeating the first image sensing step, the second image sensing step, and the layout calculation step, after additionally laying out a new auxiliary index in the physical space by a user in a case that an isolated point index other than the laid out auxiliary indices is found from the first index/index group and the second index/index group after the layout calculation step,
 wherein all of the laid out auxiliary indices are removed in a case that the isolated point index is not found from the first index/index group and the second index/index group after the layout calculation step or the execution step.

2. The method according to claim 1, wherein a visual feature of the auxiliary index is determined in advance.

3. The method according to claim 1, wherein the auxiliary index is an auxiliary marker which is physically laid out or is optically laid out by projecting onto a given surface in the physical space.

4. The method according to claim 1, wherein the layout calculation step includes;
 a first acquisition step of extracting some or all of the first index/index group and the auxiliary index from a first image sensed in the first image sensing step, and acquiring a first set, wherein the first set includes an index identifier, an image coordinate in the first image, an identifier of the first image, and a position and orientation of the movable image sensing device at a time of sensing the first image, for each of some or all of the first index/index group and the auxiliary index;
 a second acquisition step of extracting some or all of the second index/index group and the auxiliary index from a second image sensed in the second image sensing step, and acquiring a second set, wherein the second set includes an index identifier, an image coordinate in the second image, an identifier of the second image, and a position and orientation of the movable image sensing device at a time of sensing the second image, for each of some or all of the second index/index group and the auxiliary index; and
 a step of calculating the relative layout relationship among the first index/index group, the auxiliary index, and the second index/index group according to a bundle adjustment method, by using a group of the first sets acquired in the first acquisition step for one or a plurality of images obtained by performing the first image sensing step once or repeating it a plurality of number of times and a group of the second sets acquired in the second acquisition step for one or a plurality of images obtained by performing the second image sensing step once or repeating it a plurality of number of times.

5. An index layout measurement method of measuring a relative layout relationship between a first index or index group which exists in a first region in a physical space and a second index or index group which exists in a second region in the physical space by sensing an image of a plurality of indices in the physical space by a movable image sensing device, by said method comprising: using a processor to perform
 a first image sensing step of sensing an image so as to simultaneously include some or all of the first index/index group and an auxiliary index which is temporarily laid out in the physical space and a position and orientation in a three-dimensional space of which can be defined;
 a first layout calculation step of calculating a relative layout relationship between the first index/index group and the auxiliary index from one or a plurality of images obtained by performing the first image sensing step once or repeating it a plurality of number of times;
 a second image sensing step of sensing an image so as to simultaneously include some or all of the second index/index group and the auxiliary index;
 a second layout calculation step of calculating a relative layout relationship between the second index/index group and the auxiliary index from one or a plurality of images obtained by performing the second image sensing step once or repeating it a plurality of number of times;
 a third layout calculation step of calculating a relative layout relationship between the first index/index group and the second index/index group from results of the first layout calculation step and the second layout calculation step]; and an execution step of repeating the first image sensing step, the first layout calculation step, the second image sensing step, the second layout calculation step, and the third layout calculation step, after additionally laying out a new auxiliary index in the physical space by a user in a case that an isolated point index other than the laid out auxiliary indices is found from the first index/index group and the second index/index group after the third layout calculation step, wherein all of the laid out auxiliary indices are removed in a case that the isolated point index is not found from the first index/index group and the second index/index group after the third layout calculation step or the execution step.

6. The method according to claim 5, wherein the first layout calculation step includes;

a first acquisition step of extracting some or all of the first index/index group and the auxiliary index from a first image sensed in the first image sensing step, and acquiring a first set, wherein the first set includes an index identifier, an image coordinate in the first image, an identifier of the first image, and a position and orientation of the movable image sensing device at a time of sensing the first image, for each of some or all of the first index/index group and the auxiliary index; and a step of calculating the relative layout relationship between the first index/index group and the auxiliary index according to a bundle adjustment method, by using a group of the first sets acquired in the first acquisition step for one or a plurality of images obtained by performing the first image sensing step once or repeating it a plurality of number of times.

7. The method according to claim 5, wherein the second layout calculation step includes;

a second acquisition step of extracting some or all of the second index/index group and the auxiliary index from a second image sensed in the second image sensing step, and acquiring a second set, wherein the second set includes an index identifier, an image coordinate in the second image, an identifier of the second image, and a position and orientation of the movable image sensing device at a time of sensing the second image, for each of some or all of the second index/index group and the auxiliary index; and a step of calculating the relative layout relationship between the second index/index group and the auxiliary index according to a bundle adjustment method, by using a group of the second sets acquired in the second acquisition step for one or a plurality of images obtained by performing the second image sensing step once or repeating it a plurality of number of times.

8. An index layout measurement apparatus for measuring a relative layout relationship between a first index or index group which exists in a given first region in a physical space and a second index or index group which exists in a second region in the physical space by sensing an image of a plurality of indices in the physical space by a movable image sensing device, comprising:

a first image sensing unit adapted to sense an image so as to simultaneously include some or all of the first index/index group and an auxiliary index which is temporarily laid out in the physical space and a position and orientation in a three-dimensional space of which can be defined;

a second image sensing unit adapted to sense an image so as to simultaneously include some or all of the second index/index group and the auxiliary index;

a layout calculation unit adapted to calculate a relative layout relationship among the first index/index group, the auxiliary index, and the second index/index group from one or more images obtained by sensing once or more by said first image sensing unit, and one or more images obtained by sensing once or more by said second image sensing unit; and an execution unit adapted to repeat the sensing by said first image sensing unit and said second image sensing unit, and the calculation by said layout calculation unit, after additionally laying out a new auxiliary index in the physical space by a user in a case that an isolated point index is found from the first index/index group and the second index/index group after said layout calculation unit calculates the relative layout relationship, wherein all of the laid out auxiliary indices are removed in a case that the isolated point index is not found from the first index/index group and the second index/index group after operation of said layout calculation unit or said execution unit.

9. An index layout measurement apparatus for measuring a relative layout relationship between a first index or index group which exists in a given first region in a physical space and a second index or index group which exists in a second region in the physical space by sensing an image of a plurality of indices in the physical space by a movable image sensing device, comprising:

a first image sensing unit adapted to sense an image so as to simultaneously include some or all of the first index/index group and an auxiliary index which is temporarily laid out in the physical space and a position and orientation in a three-dimensional space of which can be defined;

a first layout calculation unit adapted to calculate a relative layout relationship between the first index/index group and the auxiliary index from one or more images obtained by sensing once or more by said first image sensing unit;

a second image sensing unit adapted to sense an image so as to simultaneously include some or all of the second index/index group and the auxiliary index;

a second layout calculation unit adapted to calculate a relative layout relationship between the second index/index group and the auxiliary index from one or more images obtained by sensing once or more by said second image sensing unit;

a third layout calculation unit adapted to calculate a relative layout relationship between the first index/index group and the second index/index group from results of said first layout calculation unit and said second layout calculation unit; and an execution unit adapted to repeat operations of said first image sensing unit, said first layout calculation unit, said second image sensing unit, said second layout calculation unit, and said third layout calculation unit, after additionally laying out a new auxiliary index in the physical space by a user in a case that an isolated point index other than the laid out auxiliary indices is found from the first index/index group and the second index/index group after operation of said third layout calculation unit, wherein all of the laid out auxiliary indices are removed in a case that the isolated point index is not found from the first index/index group and the second index/index group after operation of said third layout calculation unit or said execution unit.

10. A computer-readable medium encoded with a computer program for performing an index layout measurement method of measuring a relative layout relationship between a first index or index group which exists in a given first region in a physical space and a second index or index group which exists in a second region in the physical space by sensing an image of a plurality of indices] in the physical space by a movable image sensing device, said method comprising:

a first image sensing step of sensing an image so as to simultaneously include some or all of the first index/index group and an auxiliary index which is temporarily laid out in the physical space and a position and orientation in a three-dimensional space of which can be defined;

a second image sensing step of sensing an image so as to simultaneously include some or all of the second index/index group and the auxiliary index;

a layout calculation step of calculating a relative layout relationship among the first index/index group, the auxiliary index, and the second index/index group from one or a plurality of images obtained by performing the first image sensing step once or repeating it a plurality of number of times, and one or a plurality of images obtained by performing the second image sensing step once or repeating it a plurality of number of times; and an execution step of repeating the first image sensing step, the second image sensing step, and the layout calculation step, after additionally laying out a new auxiliary index in the physical space by a user in a case that an isolated point index other than the laid out auxiliary indices is found from the first index/index group and the second index/index group after the layout calculation step, wherein all of the laid out auxiliary indices are removed in a case that the isolated point index is not found from the first index/index group and the second index/index group after the layout calculation step or the execution step.

* * * * *